United States Patent [19]

Denton

[11] 4,422,530

[45] Dec. 27, 1983

[54] PENDULUM STRUCTURE

[76] Inventor: Cleo E. Denton, 1026 S. Richmond, Wichita, Kans. 67213

[21] Appl. No.: 261,962

[22] Filed: May 8, 1981

[51] Int. Cl.³ ............................................. F03G 3/06
[52] U.S. Cl. ..................................... 185/29; 40/485; 46/1 R; 368/179
[58] Field of Search ............. 185/29; 46/1 R; 40/485; 272/1 R; 434/300, 302; 368/179

[56] References Cited

U.S. PATENT DOCUMENTS

| 515,856 | 3/1894 | Bartel | 368/179 |
| 764,957 | 7/1904 | Prather | 40/485 X |
| 2,144,002 | 1/1939 | Wallace et al. | 40/485 X |
| 3,395,533 | 8/1968 | Campbell | 368/179 X |

FOREIGN PATENT DOCUMENTS

| 461084 | 12/1949 | Italy | 40/485 |
| 416267 | 9/1934 | United Kingdom | 40/485 |

Primary Examiner—Allan D. Herrmann
Attorney, Agent, or Firm—Phillip A. Rein

[57] ABSTRACT

This invention is a pendulum structure that operates as near as possible as a perpetual motion machine to provide activity and entertainment to one using same. The pendulum structure includes: (1) a housing assembly; (2) a pendulum assembly mounted within the housing assembly; and (3) an actuator assembly connected to the pendulum assembly. The housing assembly includes a bottom assembly connector by a wall assembly to a top assembly. The bottom assembly and the top assembly are substantially identical, each being of a tray shape, having a bottom wall section with integral side wall sections and end wall sections. The wall assembly is preferably constructed of a transparent material having a front wall and a back wall interconnected by opposed side walls. The front wall has an arcuate slot therein to gain access to the interior of the housing assembly. The pendulum assembly includes a basic support member and a pendulum member attached by a connector assembly to the basic support member. The basic support member extends horizontally within the housing assembly with opposite ends secured to respective ones of the opposed side walls. The pendulum member is pivotally connected to a central portion of the basic support member. The pendulum member includes an elongated body member with a weighted head member secured to a lower portion of the body member in order to act similarly to a conventional pendulum member. The actuator assembly includes bias members secured to the basic support member and being engageable with the head member of the pendulum member. The bias members are preferably compression spring members that act on being compressed to impart additional energy to the pendulum member to keep same moving. A second embodiment of this invention provides a dual pendulum structure wherein the pendulum member includes a head member attached to each outer end of the basic support member. Additionally, the actuator assembly includes four of the compression spring members to conduct opposed sides of the respective bead member to impart energy and resultant motion thereto.

3 Claims, 8 Drawing Figures

PENDULUM STRUCTURE

PRIOR ART

A search of the prior art revealed the following U.S. Pat. Nos.: 99,386; 3,214,854; 2,753,830; 3,270,450.

All of the above references teach the use of a pendulum assembly but not operable in a manner set forth by this invention. The Wilson patent teaches the use of a basic pendulum in an electric clock apparatus.

The Phillsburg et al patent discloses a weighted pendulum structure with motion controlled by inertia. The Swan patent discloses a pendulum movable by magnetic forces.

The Flum patent discloses a complex pendulum type linkage assembly for point-of-purchase displays that is powered by a motor member.

PREFERRED EMBODIMENT OF THE INVENTION

In a preferred embodiment of the invention, a pendulum structure includes a housing assembly; a pendulum assembly mounted within the housing assembly; and an actuator assembly connected to the pendulum assembly. The housing assembly is of a rectangular box shape having a transparent mid-section to allow visual observation of activity within the housing assembly. The pendulum assembly includes a basic support member secured to the housing assembly and having a pendulum member pivotally connected to a central portion of the basic support member. The pendulum member is of a conventional shape with an elongated body member with an enlarged, weighted head member secured to an outer end thereof. The actuator assembly includes bias members engageable with opposite sides of the head member to apply energy and resultant movement to the head member. The actuator assembly acts to keep a pivoting or swinging pendulum in constant motion.

OBJECTS OF THE INVENTION

One object of this invention is to provide a pendulum structure that is attractive in appearance, simple to use, and provides entertainment to one utilizing same.

Another object of this invention is to provide a pendulum structure having a pendulum member pivotally mounted within a transparent housing assembly and having means to gain access through the housing assembly to import motion to the pendulum member.

One other object of this invention is to provide a pendulum structure having a pendulum member mounted within a housing assembly and an actuator assembly connected to the housing assembly and periodically engageable with the pendulum member to import energy and resultant motion thereto.

Still, another object of this invention is to provide a dual pendulum structure with a pendulum member having a basic support member with weighted head members connected to opposed outer ends of the basic support member.

A further object of this invention is to provide a pendulum structure that is inexpensive to manufacture; easy to use; provides entertainment; and attempts to achieve perpetual motion action.

Various other objects, advantages, and features of the invention will become apparent to those skilled in the art from the following discussion, taken in conjunction with the accompanying drawings, in which:

FIGURES OF THE INVENTION

Figure 1:
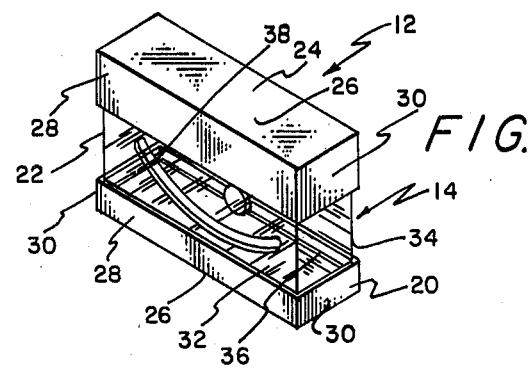
FIG. 1 is a perspective view of a pendulum structure of this invention.

The following is a discussion and description of preferred specific embodiments of the pendulum structure of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular, to FIG. 1, a pendulum structure of this invention, indicated generally at 12, includes (1) a main rectangular housing assembly 14; (2) a pendulum assembly 16 mounted within the housing assembly 14; and (3) an actuator assembly 18 connected to the pendulum assembly 16 to impart motion thereto.

The housing assembly includes a bottom assembly 20 connected by a wall assembly 22 to a top assembly 24. The bottom assembly 20 and the top assembly 24 are substantially identical being of a rectangular tray or box shape having a bottom wall section 26 integral with integral side wall sections 28 and end wall sections 30.

Figure 2:
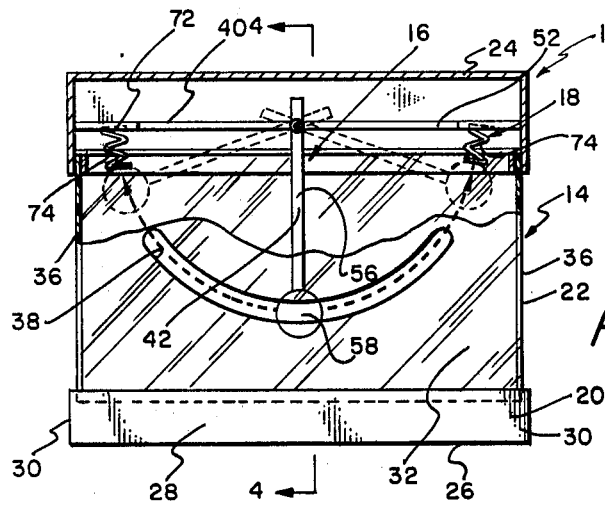
FIG. 2 is a side elevational view of the pendulum structure of this invention having portions broken away for clarity.

The wall assembly 22 is preferably constructed of a transparent material such as plexiglass so that one can readily observe movement of the pendulum assembly 16 for reasons to become obvious. More particularly, the wall assembly 22 includes a front wall 32 and a back wall 34 interconnected by opposed side walls 36. As noted in FIGS. 1 and 2, the front wall 32 is provided with an arcuate slot or opening 38 so that one can gain access to the pendulum assembly 16 for reasons to be explained.

The pendulum assembly 16 includes (1) a basic support member 40 secured to the side walls 36 of the wall assembly 22; (2) a pendulum member 42; and (3) a connector assembly 44 to pivotally connect the pendulum member 42 to the basic support member 40.

Figure 5:
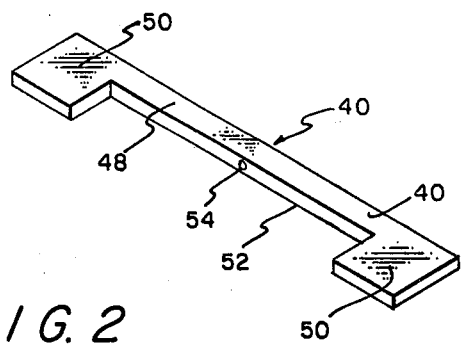
FIG. 5 is a perspective view of a basic support member of the pendulum assembly of this invention.

As shown in FIG. 5, the basic support member 40 includes a main body 46 having a central portion 48 with head or connector portions 50 integral with outer ends of the central portion 48. It is noted that the central portion 48 is of a width less than the connective portions 50 and secured to one side thereof. This provides an open area 52 therebetween to allow for swing motion of the pendulum member 42. The central portion 48 is provided with a hole 54 to receive a portion of the connector assembly 44 in a manner to be explained.

The pendulum member 42 includes an elongated body member 56 having a weighted head member 58 secured to one outer end thereof. The body member 56 resembles a rod structure and having a connector hub 60 integral at another outer end thereof. The connector hub 60 has a connector hole 62 adapted to be aligned with the hole 54 in the central portion 48 for reasons to be explained.

The head member 58 is shown of generally spoon shape but operates as any pendulum head to provide an equally balanced structure so as to provide equal forces for the swinging or pendulum movement of the pendulum member 42.

Figure 3:
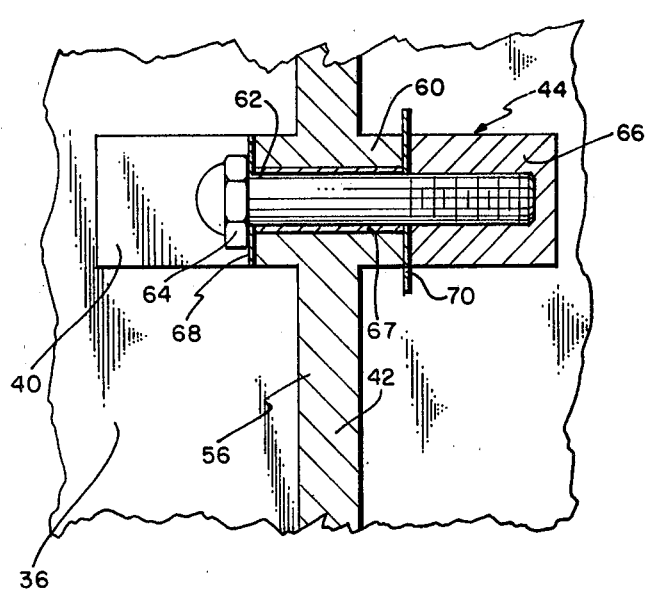
FIG. 3 is an enlarged fragmentary sectional view of a pendulum assembly of the pendulum structure of this invention.
Figure 4:
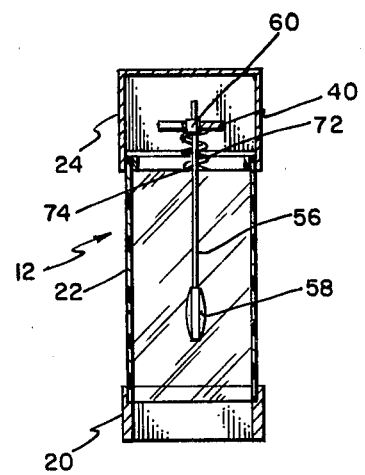
FIG. 4 is a sectional view of the pendulum structure taken along line 4—4 in FIG. 2.

As best shown in FIG. 3, the connector assembly 44 includes a bolt member 64; a nut member 66 connected to the bolt member 64; a sleeve member 67 mounted about the bolt member 64; and a pair of washer member 68, 70 mounted between the bolt member 64 and the nut member 66.

The nut member 66 can be of circular shape to match the connector hub 60 to achieve an attractive appearance.

The washer members 68, 70 and the sleeve member 67 are preferably constructed of a anti-friction material such as teflon to reduce resistance to pivotal movement of the pendulum member 42.

The actuator assembly 18 includes a bias assembly 72 secured to the basic support member 40 and engageable with the pendulum member 42 to impart energy and resultant motion thereto.

More particularly, the bias assembly 72 includes a pair of compression spring members 74, each secured to and downwardly dependent from a respective connector portion 50 of the basic support member 40. As noted in FIG. 3, the compression spring members 74 are properly positioned on the basic support member 40 so as to contact respective opposite sides of the head member 58 of the pendulum member 42. It is obvious that the compression spring member 74 would first "compress" and the "expand" to impart downward motion to the head member 58 as will be explained.

Figure 6:
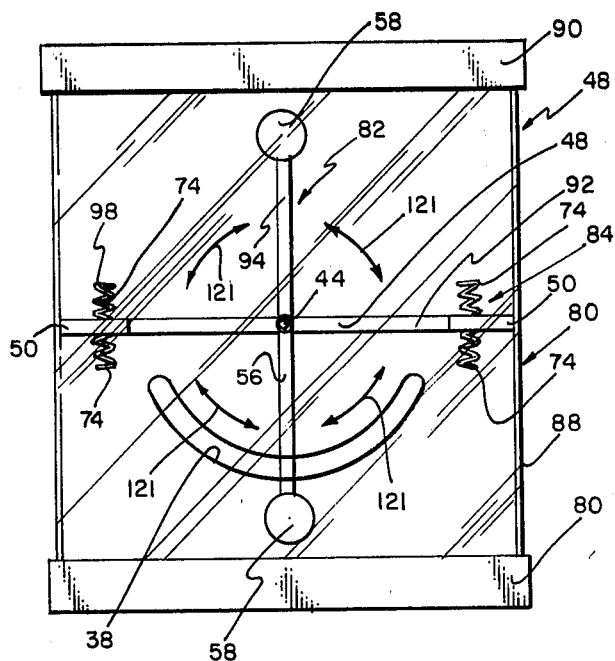
FIG. 6 is a side elevational view of a dual pendulum structure of this invention being another embodiment.
Figure 7:
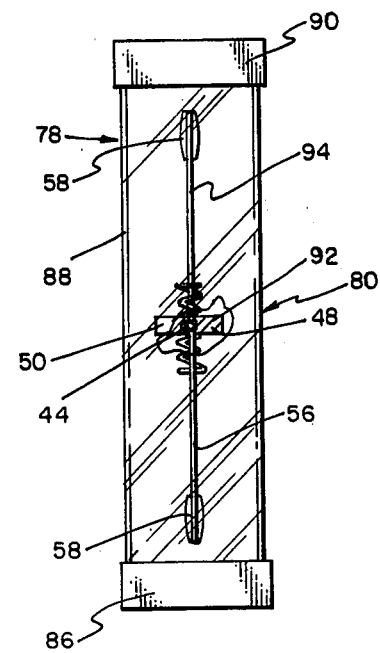
FIG. 7 is an end elevational view of the dual pendulum structure embodiment.

A second embodiment of this invention is shown in FIGS. 6 and 7, being a dual pendulum structure 78 including (1) a main rectangular housing assembly 80; (2) a pendulum assembly 82 mounted within the housing assembly 80; and (3) an actuator assembly 84 connected to the pendulum assembly 82 to import motion thereto. The housing assembly 80 is substantially identical to the above described housing assembly 14 having a bottom assembly 86 connected through a wall assembly 88 to a top assembly 90. The wall assembly 88 is of an extended height to accomodate the pendulum assembly 82 for obvious reasons.

The pendulum assembly 82 includes a basic support member 92; a dual pendulum member 94; and one of the connector assembly 44 pivotally connecting the dual pendulum member 94 to the basic support member 92.

The basic support member 92 is substantially identical to the basic support member 40 having a central portion 48 with outer head or connector portion 50.

As noted in FIGS. 6 and 7, the dual pendulum member 94 includes an enlongated main body 56 having a weighted head member 58 secured to each respective outer ends thereof. A center portion 96 of the main body 56 has the connector hole 60 and the connector hole 62 for connection to the central portion 48.

The connector assembly 44 used herein has been previously described.

The actuator assembly 84 includes a bias assembly 98 similar to the bias assembly 72 except having four of the compressor spring members 74, each connected to a portion of the connector portions 50. It is obvious from FIG. 6 that the upper spring members 74 engage the upper head member 58 and the lower spring members 74 engage the lower head member 58.

Figure 8:
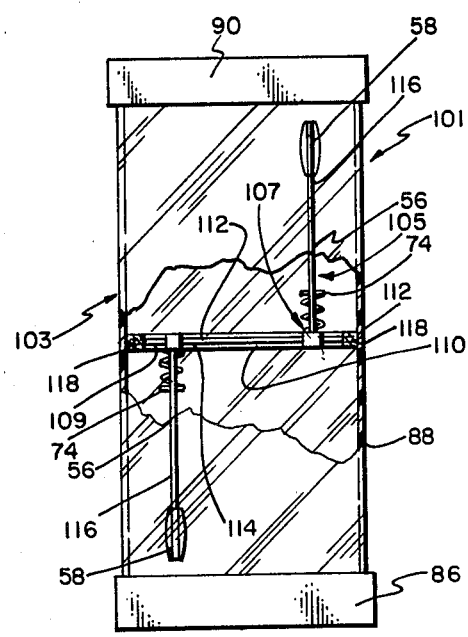
FIG. 8 is a front elevational view of another embodiment of this invention being an offset dual pendulum structure having portions thereof broken away for clarity.

A third embodiment of this invention is shown in FIG. 8 being an offset, dual pendulum structure 101 including (1) a main rectangular housing assembly 103; (2) a pendulum assembly 105 mounted within the housing assembly 103; and (3) an actuator assembly 107 connector to the pendulum assembly 105. The housing assembly 103 is substantially identical to the housing assembly 80 except for having an additional width for obvious reasons.

The pendulum assembly 105 includes a basic support member 109; an offset dual pendulum member 110; and a connector assembly 112 to pivotally connect the offset dual pendulum member 110 to the basic support member 109.

The basic support member 109 is secured about its outer periphery to the wall assembly 88 leaving a large central open area 112 for movement of the offset dual pendulum member 110 therein.

The dual pendulum member 110 includes a main support shaft 114 having spaced pendulum members 116 secured thereto. Each pendulum member 116 includes an elongated main body 56 having a weighted head member 58 secured to an outer end thereof. It is seen that the pendulum members 116 are parallel to each other and extended from opposite sides of the main support shaft 114.

The connector assembly 112 includes a bearing assembly 118 secured to opposed portions of the basic support member 109 and adapted to receive a respective outer end of the main support shaft 114 therein. The bearing assemblies 118 are constructed of a teflon or anti-friction material for obvious reasons.

The actuator assembly 107 is substantially identical to the actuator assembly 84 having four of the compression spring members 74. The compression spring members 74 are properly connected to and spaced on the basic support member 109 to contact the respective head members 58.

USE AND OPERATION OF THE INVENTION

The pendulum structure 12 of this invention is shown in the assembled condition in FIG. 1. As noted in FIG. 2, a person inserts his finger through the arcuate opening 38 to contact the pendulum member 42 and impart an upward motion thereto. The head member 58 then contacts a compression spring member 74 which compresses and then expands to reverse direction of movement of the head member 58. The head member 58 then travels downwardly and then upwardly to impact the other compression spring member 74. This spring member 74 is then compressed and then expanded to reverse direction of the pendulum member 42.

It is noted that this swinging movement of the pendulum member 42 continues for an extended period due to (1) the use of the compression spring members 74; (2) precise design and weight characteristics of the pendulum member 42; and (3) the anti-friction characteristics of the connector assembly 44.

The operation of the dual pendulum structure 78 is substantially identical to the pendulum structure 12 with movement indicated by the arrows 121 in FIG. 6. The obvious difference is in the dual pendulum member 94 and use of the four compression spring members 74.

The operation of the offset, dual pendulum structure 101 is substantially identical to that of the dual pendulum structure 78 except that the pendulum members 116 are mounted offset on the main support shaft 114.

It is seen that the pendulum structure of this invention provides an attractive structure that can produce hours of enjoyment and may be used by substantially everyone. The pendulum structure is compact, easy to transport, easy to use, and safe in operation.

While the invention has been described in conjunction with preferred specific embodiments thereof, it will be understood that this description is intended to illustrate and not to limit the scope of the invention, which is defined by the following claims.

I claim:

1. A pendulum structure, comprising;
   (a) a housing assembly;
   (b) a pendulum assembly having a pendulum member pivotally connected to said housing assembly for swinging movement therein;
   (c) an actuator assembly connected to said housing assembly having a bias member engagable with said pendulum member to impart energy thereto to aid in said swinging movement;
   (d) said pendulum member being a dual pendulum member includes a main body having a head member secured to outer ends thereof;
   (e) said main body pivotally connected to said housing assembly at a central portion thereof;
   (f) said actuator assembly having a plurality of bias members engagable with respective ones of said head members; and
   (g) said head members concurrently engagable with respective ones of said bias members at the same time to receive from and impart energy to said head members.

2. A pendulum structure as described in claim 1, wherein:
   (a) said pendulum assembly includes a basic support member pivotally connected to said housing assembly;
   (b) said dual pendulum members each having one of said main body with said head members connected to each outer end of said main bodies; and
   (c) said dual pendulum members mounted offset on said basic support member and extended in opposite directions.

3. A pendulum structure as described in claim 2, wherein;
   (a) said bias member having pairs of spaced compression spring members selectively and concurrently engageable with respective ones of said head members to first absorb energy from said head member; stop said swinging movement of said head member in one direction; and transfer energy to said head member for movement in an opposite direction from said one direction.

* * * * *